(12) United States Patent
Kato et al.

(10) Patent No.: US 10,829,157 B2
(45) Date of Patent: Nov. 10, 2020

(54) VEHICLE BODY STRUCTURE

(71) Applicant: HONDA MOTOR CO., LTD., Tokyo (JP)

(72) Inventors: Takashi Kato, Wako (JP); Ken Yasui, Wako (JP); Koichi Takahashi, Wako (JP); Satoru Kawabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/058,115

(22) Filed: Aug. 8, 2018

(65) Prior Publication Data

US 2019/0047625 A1   Feb. 14, 2019

(30) Foreign Application Priority Data

Aug. 9, 2017   (JP) ................. 2017-154695

(51) Int. Cl.
*B62D 21/11*   (2006.01)
*B62D 24/00*   (2006.01)
(Continued)

(52) U.S. Cl.
CPC ............... *B62D 21/11* (2013.01); *B60G 3/18* (2013.01); *B60G 3/20* (2013.01); *B60G 7/02* (2013.01);
(Continued)

(58) Field of Classification Search
CPC .... B62D 21/11; B62D 21/152; B62D 21/155; B62D 24/00; B62D 25/2027; B60G 7/02; B60G 2200/141; B60G 2204/143; B60G 2204/15; B60G 3/06; B60G 3/14; B60G 3/18; B60G 3/20; B60K 2001/0438
See application file for complete search history.

(56) References Cited

U.S. PATENT DOCUMENTS 2,997,313 A * 8/1961 Wall .................. B62D 21/11
                                                  180/89.1
3,603,422 A * 9/1971 Cordiano ............. B60G 3/24
                                                  180/359
(Continued)

FOREIGN PATENT DOCUMENTS

CN   101497305 A      8/2009
JP   01044306 A  *   2/1989   ............... B60G 7/02
(Continued)

OTHER PUBLICATIONS

Japanese Office Action with English translation dated Jul. 9, 2019 (7 pages).
(Continued)

*Primary Examiner* — Laura Freedman
(74) *Attorney, Agent, or Firm* — Rankin, Hill & Clark LLP

(57) ABSTRACT

A vehicle body structure includes: a pair of left and right suspensions provided below a vehicle body floor; suspension mounting portions for mounting the suspensions to the vehicle body floor; a power supply device that supplies power to drive a vehicle; a frame that supports the power supply device; and frame mounting portions for mounting the frame to the vehicle body floor, wherein the frame mounting portions are disposed at positions overlapping in a vertical direction with the suspension mounting portions.

4 Claims, 8 Drawing Sheets

(51) Int. Cl.
  *B60G 7/02* (2006.01)
  *B60G 3/20* (2006.01)
  *B60G 3/18* (2006.01)
(52) U.S. Cl.
  CPC ........ *B62D 24/00* (2013.01); *B60G 2200/141* (2013.01); *B60G 2204/143* (2013.01)

(56) References Cited

U.S. PATENT DOCUMENTS

| | | | | |
|---|---|---|---|---|
| 4,746,146 | A * | 5/1988 | Hirabayashi | B60G 3/202 280/124.108 |
| 5,911,426 | A * | 6/1999 | Yamamoto | B60G 3/04 180/65.1 |
| 6,869,090 | B2 * | 3/2005 | Tatsumi | B60G 3/20 280/124.109 |
| 7,325,820 | B2 * | 2/2008 | Allen | B60G 3/18 280/124.109 |
| 7,533,748 | B2 * | 5/2009 | Miyajima | H01M 8/247 180/68.5 |
| 7,610,978 | B2 * | 11/2009 | Takasaki | B60K 1/04 180/68.5 |
| 7,654,543 | B2 * | 2/2010 | Tanaka | B60G 7/02 180/312 |
| 7,905,503 | B2 * | 3/2011 | Goto | B62D 25/087 280/124.109 |
| 8,393,426 | B2 * | 3/2013 | Takahashi | B60K 1/04 180/68.5 |
| 8,585,132 | B2 * | 11/2013 | Klimek | B60K 1/04 296/187.08 |
| 9,067,627 | B2 * | 6/2015 | Hara | B62D 21/152 |
| 9,242,540 | B2 * | 1/2016 | Shirooka | B60K 1/04 |
| 9,387,751 | B2 * | 7/2016 | Kashiwai | B60K 1/00 |
| 9,914,480 | B2 * | 3/2018 | Taguchi | B62D 21/11 |
| 10,414,225 | B2 * | 9/2019 | Matsushita | B60G 3/20 |
| 10,421,327 | B2 * | 9/2019 | Matsushita | B60G 7/001 |
| 10,442,283 | B2 * | 10/2019 | Kato | B60L 50/64 |
| 10,471,789 | B2 * | 11/2019 | Matsushita | B60G 7/001 |
| 10,471,791 | B2 * | 11/2019 | Yanagida | B60G 7/02 |
| 2009/0152034 | A1 | 6/2009 | Takasaki et al. | |
| 2016/0090124 | A1 * | 3/2016 | Kaneko | B62D 25/2027 296/203.04 |
| 2019/0023093 | A1 * | 1/2019 | Gerhards | B60K 1/04 |

FOREIGN PATENT DOCUMENTS

| | | | |
|---|---|---|---|
| JP | 01070276 | A * | 3/1989 |
| JP | 04085182 | A * | 3/1992 |
| JP | 04126676 | A * | 4/1992 |
| JP | 11334332 | A * | 12/1999 |
| JP | 3785920 | B2 | 6/2006 |
| JP | 2009-255663 | A | 11/2009 |
| JP | 2011218910 | A * | 11/2011 |

OTHER PUBLICATIONS

Office Action received in corresponding CN application No. 201810890549.0 dated Aug. 5, 2020 with English translation (15 pages).

* cited by examiner

FIG. 2
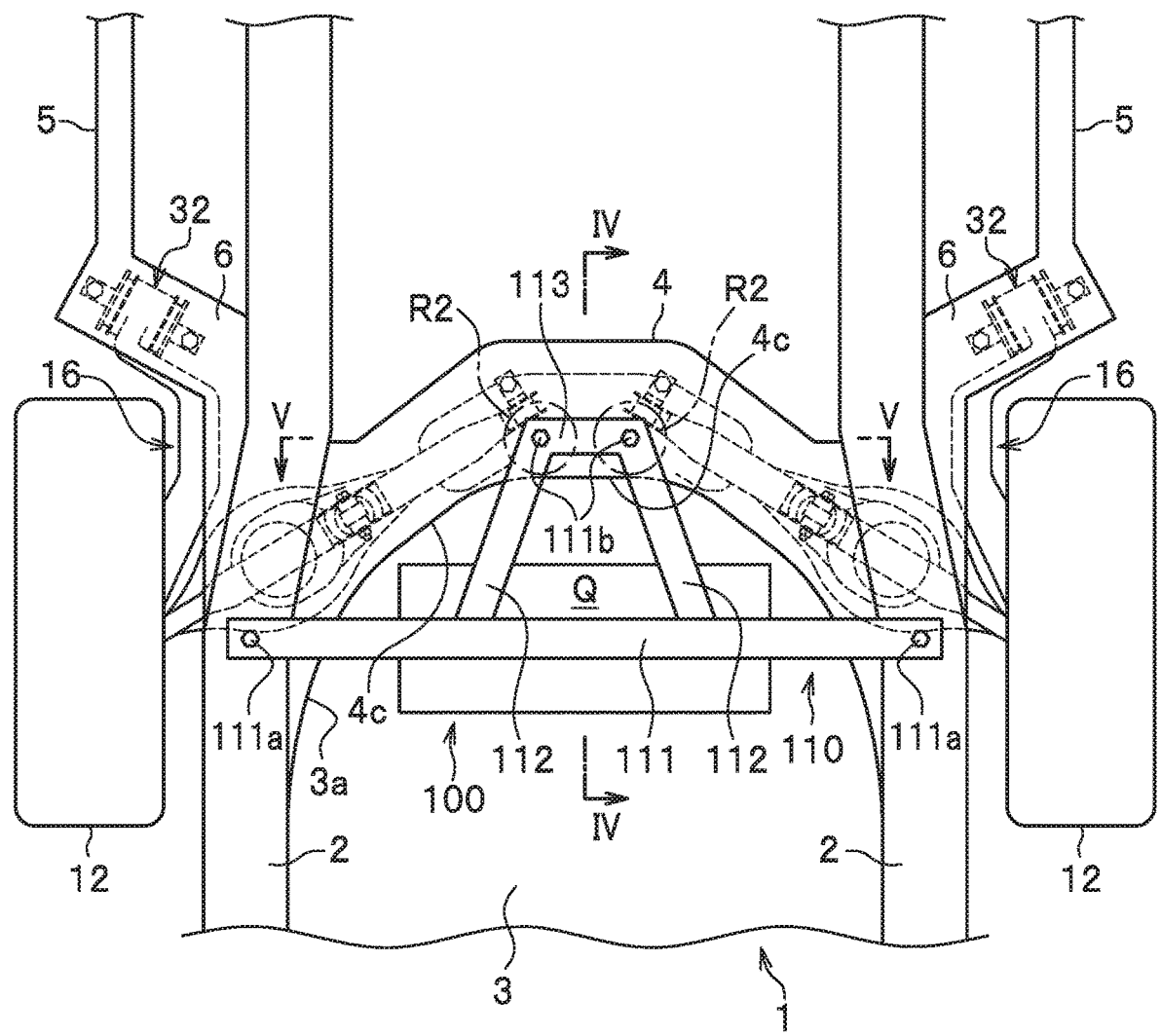
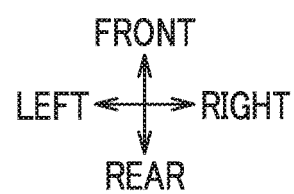

FIG. 6
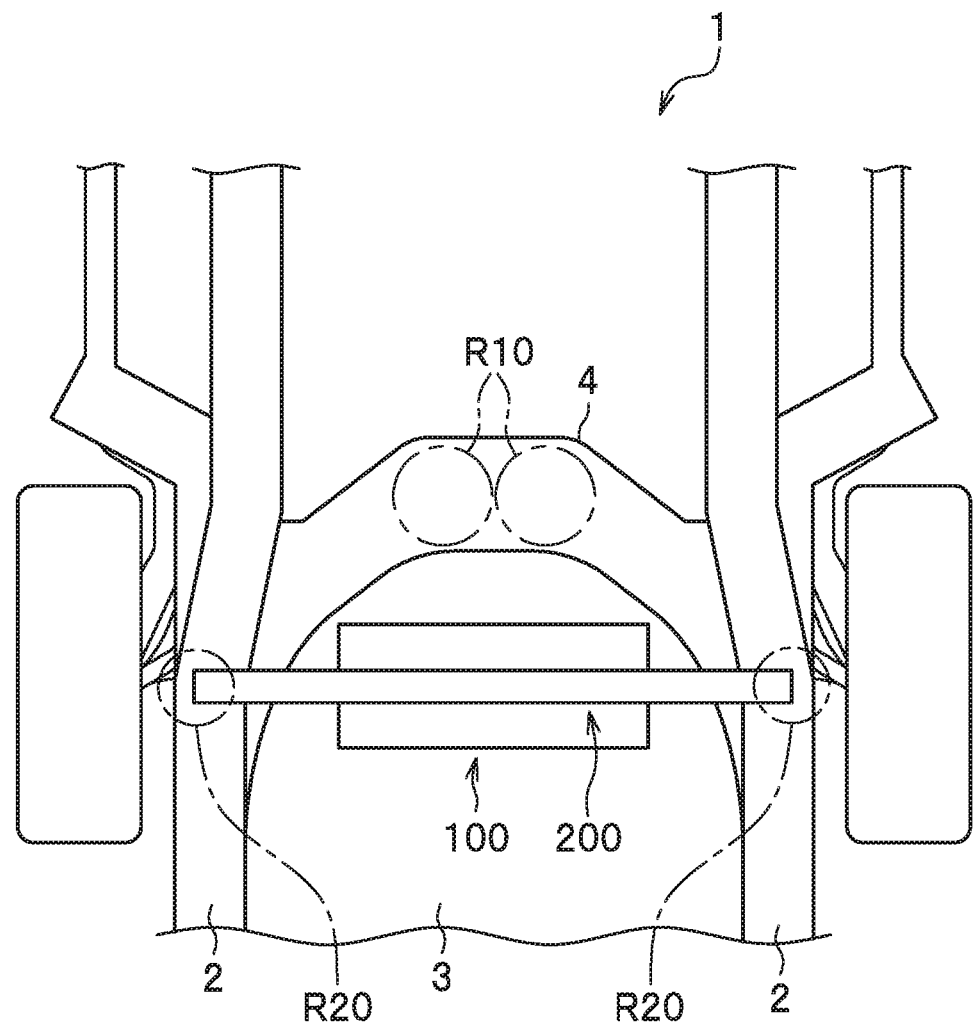
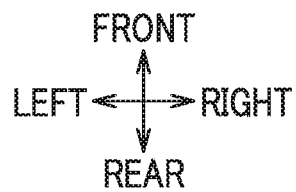

VEHICLE BODY STRUCTURE

BACKGROUND OF THE INVENTION

1. Field of the Invention

The present invention relates to a vehicle body structure of an automobile.

2. Description of the Related Art

Japanese Patent No. 3785920 describes a technology to set a mounting point (arm bracket) in a floor center portion of a vehicle body by means of a suspension member, the mounting point being positioned on the center side of a semi-trailing suspension.

However, the technology described in Japanese Patent No. 3785920 has a problem that vibrations propagated from tires to the vehicle body through the suspension are increased when a lower arm of the suspension is directly fastened to the vehicle body (suspension member).

SUMMARY OF THE INVENTION

The present invention has been made to solve the above conventional problem and makes it an object thereof to provide a vehicle body structure capable of effectively suppressing vibrations propagated from a suspension to a vehicle body.

A vehicle body structure of the present invention includes: a pair of left and right suspensions provided below a vehicle body floor; suspension mounting portions for mounting the suspensions to the vehicle body floor; a power supply device that supplies power to drive a vehicle; a frame that supports the power supply device; and frame mounting portions for mounting the frame to the vehicle body floor, wherein the frame mounting portions are disposed at positions overlapping in a vertical direction with the suspension mounting portions.

According to the present invention, a vehicle body structure capable of effectively suppressing vibrations propagated from the suspension to the vehicle body can be provided.

BRIEF DESCRIPTION OF THE DRAWINGS

FIG. 2 is a plan view schematically showing the vehicle body structure according to the first embodiment.

FIG. 6 is a plan view showing a vehicle body structure as a comparative example.

DETAILED DESCRIPTION OF THE EMBODIMENTS

Embodiments of the present invention will be hereinafter described in detail with reference to the accompanying drawings. Note that a vehicle having a vehicle body structure according to this embodiment is applicable to various types of vehicles equipped with a high-voltage power supply device to drive a vehicle, such as a hybrid vehicle with an engine and a motor (not shown) as a drive source, a series hybrid vehicle that runs with a motor using an engine only as a generator, and an electric vehicle or fuel cell vehicle with a motor (not shown) as a drive source. Moreover, "front-rear", "left-right", and "top-bottom" shown in each of the drawings represent a vehicle front-rear direction, a vehicle width direction (left-right direction), and a vehicle top-bottom direction (vertical top-bottom direction), respectively.

First Embodiment

Figure 1:
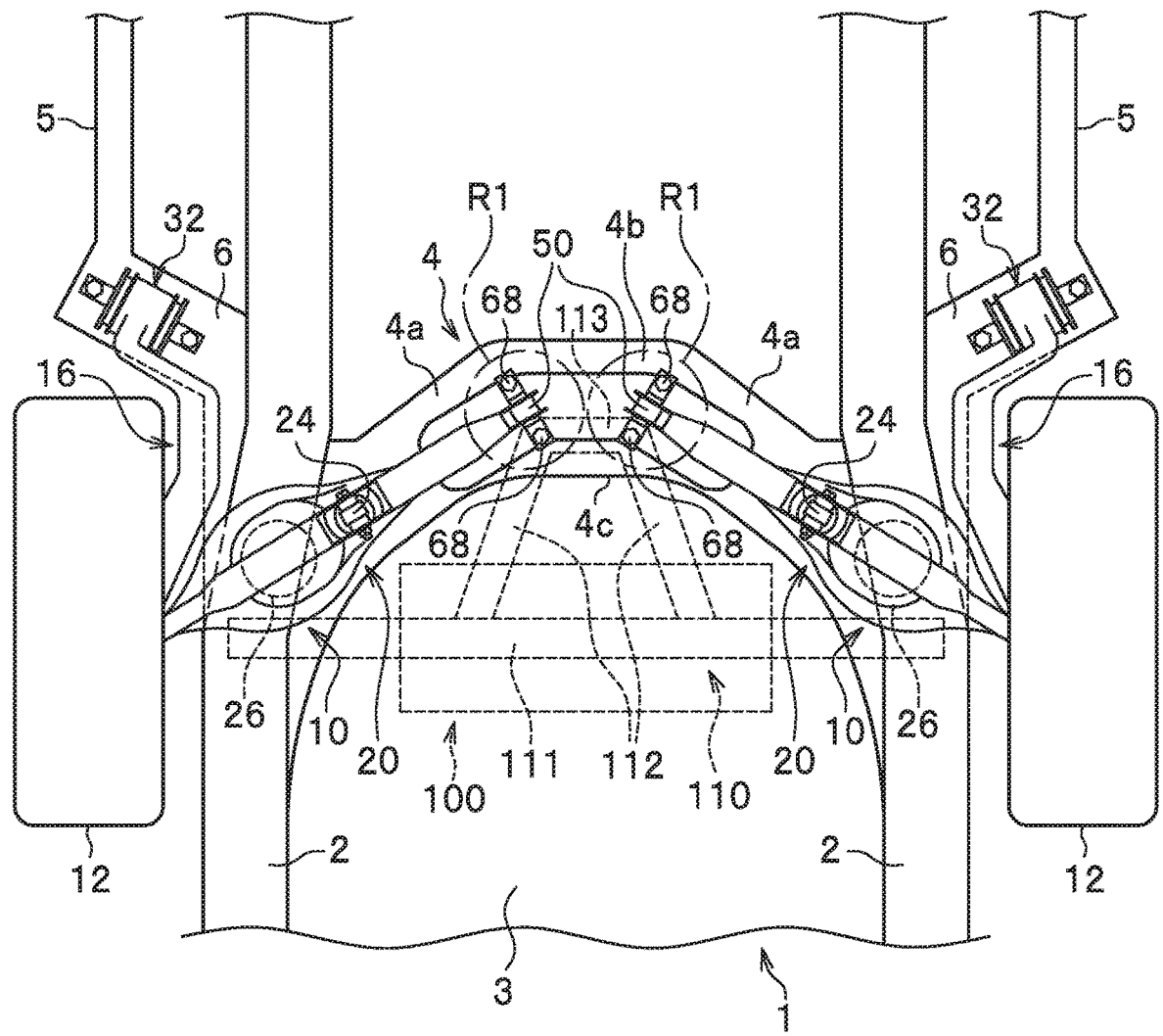
FIG. 1 is a bottom view schematically showing a vehicle body structure according to a first embodiment.

FIG. 1 is a bottom view schematically showing a vehicle body structure according to a first embodiment. FIG. 2 is a plan view schematically showing the vehicle body structure of the vehicle according to the first embodiment. Note that FIG. 1 is a view of the vehicle seen from below (bottom side), while FIG. 2 is a view of the vehicle seen from above.

As shown in FIG. 1, a car (vehicle) having the vehicle body structure of the first embodiment includes: a pair of left and right suspension devices (suspensions) 10 and 10 (hereinafter collectively referred to as the suspension device 10) provided below a vehicle body floor 1; a power supply device 100 that supplies power to drive (run) the vehicle; and a fixing frame 110 (frame) to fix the power supply device 100 to the vehicle body. Note that the vehicle body floor 1 shown in FIGS. 1 and 2 represent a region in front of and behind left and right rear wheels 12 and 12.

The vehicle body floor 1 forms a floor surface of the vehicle, and includes a pair of rear side frames 2 and 2 disposed so as to be spaced apart from each other in the left-right direction, a rear floor panel (so-called tire pan) 3 disposed between the pair of rear side frames 2 and 2, and a rear cross member 4 attached between the rear side frames 2 and 2. The rear floor panel 3 is disposed in a region surrounded by the rear side frames 2 and 2 and the rear cross member 4, and protrudes toward the front side in a space vertical direction in FIG. 1.

Also, the vehicle body floor 1 includes: side sills 5 and 5 extending in the front-rear direction on the outside of the rear side frames 2 and 2 in the vehicle width direction; and curved parts 6 and 6 extending at rear ends of the side sills 5 and 5 from the rear side frames 2 and 2. Note that, although not shown, a rear floor panel is provided between the rear side frames 2 and the side sills 5 and between the rear side frames 2 and 2 in front of the rear cross member 4.

The suspension devices 10 are disposed independently for the left rear wheel 12 and the right rear wheel 12 (hereinafter also referred to as the wheels 12), and configured as independent suspension type rear suspensions for rotatably supporting the left and right rear wheels 12 and 12, respectively. Note that, at the right rear wheel 12 and the left rear wheel 12, the suspension devices 10 and 10 having the same configuration are disposed in symmetrical positions.

The rear cross member 4 supports a part of the suspension devices 10 and 10, and is configured including: tilted parts 4a and 4a extending obliquely inward and forward in the vehicle width direction (left-right direction) from the right rear wheel 12 and the left rear wheel 12; and a straight part 4b extending in the vehicle width direction (left-right direction) to connect leading ends of the tilted parts 4a and 4a. Thus, the rear cross member 4 is formed in an approximately boomerang shape or approximately V-shape so as to protrude forward in plan views from above the vehicle (see FIG. 2) and from below the vehicle (see FIG. 1).

As shown in FIG. 2, the power supply device 100 has a high-voltage power storage device (high-voltage battery) that supplies power to a motor to drive the wheels (for example, the front wheels). Also, the power supply device 100 is configured by combining the power storage device and a power control unit (PCU). The PCU is configured by combining an inverter, a DC-DC converter, a contactor for opening and closing an electric circuit, and the like.

The power storage device provided in the power supply device 100 is a high-voltage power storage device capable of output of several hundred volts, for example, and includes a secondary battery such as a lithium-ion secondary battery and a nickel-metal-hydride secondary battery. Note that the power supply device 100 is not limited to the one configured by combining the high-voltage power storage device with the PCU, but may simply be one including only the high-voltage power storage device. Thus, the power supply device 100 includes relatively heavy goods as a device mounted on the vehicle.

Moreover, the power supply device 100 has an elongated shape in the vehicle width direction in the plan view from the top-bottom direction, and is disposed inside a recess 3a formed in the rear floor panel 3. The recess 3a is formed inside a region surrounded by a rear end 4c of the rear cross member 4 and the left and right rear side frames 2 and 2. Moreover, the power supply device 100 is disposed closer to the rear cross member 4 in the recess 3a.

In the fixing frame 110, a first frame part 111 which is positioned above the power supply device 100 and extends in the vehicle width direction is integrally formed with second frame parts 112 and 112 extending forward from the first frame part 111. The fixing frame 110 also has a connection part 113 integrally formed therein, which extends in the vehicle width direction so as to connect leading ends of the second frame parts 112 and 112. The first frame part 111 and the second frame parts 112 and 112 are formed of metal plate materials such as iron.

Note that the configuration of the fixing frame 110 is not limited to that of this embodiment but may be changed as appropriate according to the size of the power supply device 100 and the like. For example, two first frame parts 111 may be disposed parallel to each other so as to be spaced apart in the front-rear direction. Alternatively, the fixing frame 110 may have an approximately triangular shape (approximately trapezoidal shape) in the plan view with base ends of the second frame parts 112 and 112 as both left and right ends of the first frame part 111.

The first frame part 111 is formed to be longer than the power supply device 100 in the vehicle width direction, and has both left and right ends fixed to upper surfaces of the rear side frames 2 and 2 with bolts 111a and 111a. The second frame parts 112 and 112 have their leading ends fixed to an upper surface of the rear cross member 4 with bolts 111b and 111b (see FIG. 2).

Figure 3:
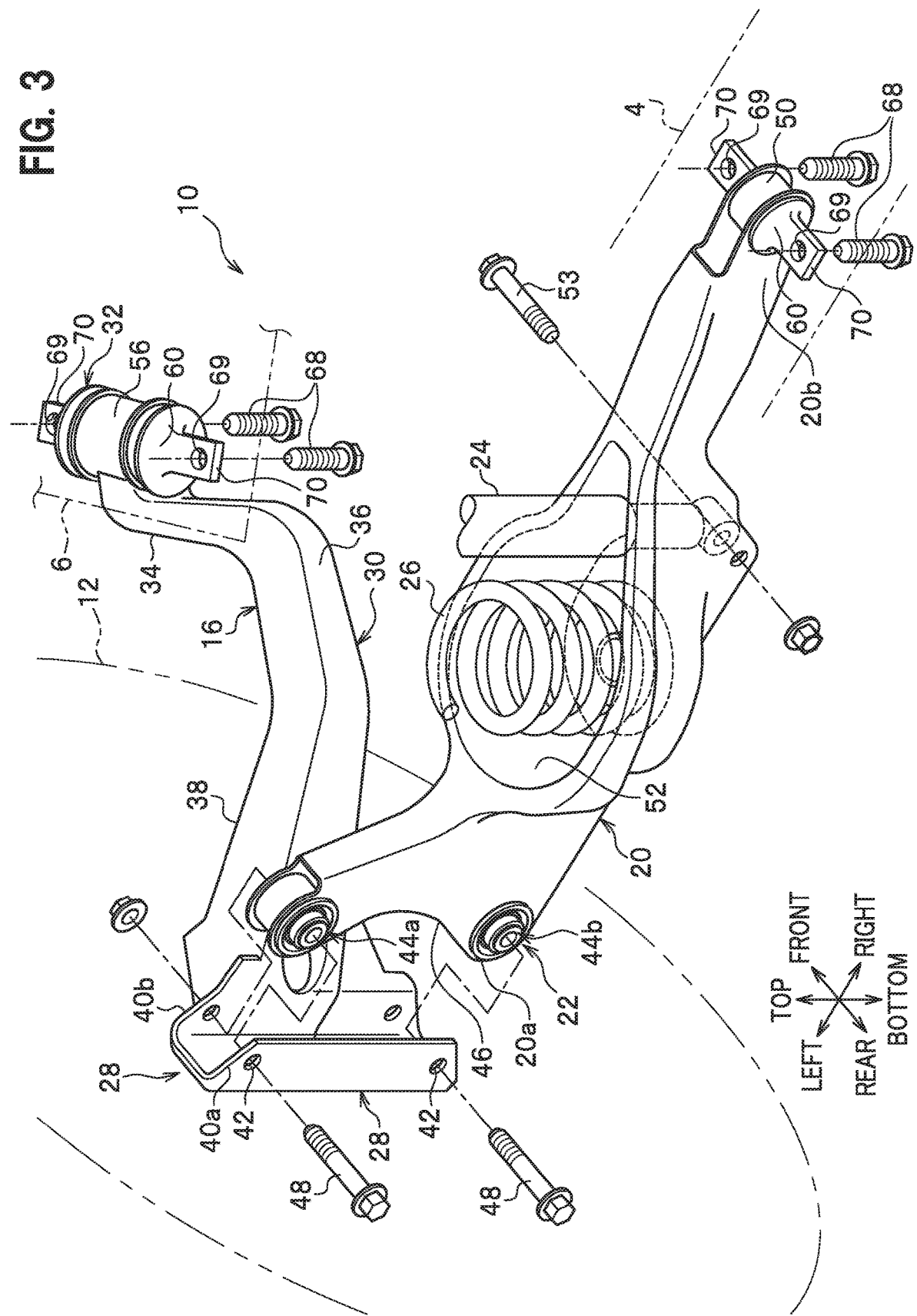
FIG. 3 is an exploded perspective view showing a suspension device.

FIG. 3 is an exploded perspective view showing the suspension device.

As shown in FIG. 3, the suspension device 10 is configured including a semi-trailing suspension including: a trailing arm 16 that rotatably supports the wheel (left rear wheel) 12 through an unillustrated axle and is turnably connected to the curved part 6; a lower arm 20 that supports a vehicle rear part of the trailing arm 16; and a hinge mechanism 22 that relatively displaceably connects (couples) the trailing arm 16 and the lower arm 20. The suspension device 10 further includes a damper 24 and a spring 26, which are separately disposed for the lower arm 20.

The trailing arm 16 is positioned at a rear end in the vehicle front-rear direction, and includes an arm main body part 28 having the hinge mechanism 22 provided therein and an arm part 30 extending toward the front of the vehicle from the arm main body part 28. The arm part 30 has a trailing push 32 attached to its vehicle front end, which turnably supports the trailing arm 16.

The arm part 30 includes: an L-shaped curved part 34 attached to the trailing push 32 and curved in an approximately L-shape (see FIG. 1) in the bottom view; a straight part 36 extending continuously with the L-shaped curved part 34 and approximately linearly along the vehicle front-rear direction; and an intersection part 38 that extends from the straight part 36 to the arm main body part 28, extends outward in the vehicle width direction from the inside in the vehicle width direction in the bottom view, and intersects with the vehicle front-rear direction.

The arm main body part 28 includes a pair of opposed pieces 40a and 40b extending along the vehicle top-bottom direction and facing approximately parallel to each other. The pair of opposed pieces 40a and 40b protrude approximately inward in the vehicle width direction, respectively, and have bolt insertion holes 42 formed in upper and lower parts thereof.

The lower arm 20 has a vehicle width outer end 20a and a vehicle width inner end 20b. The vehicle width outer end 20a has a pair of rubber bushes 44a and 44b attached thereto, which are spaced apart from each other by a predetermined distance along the top-bottom direction. Between the pair of rubber bushes 44a and 44b, a depressed part 46 is formed, which is depressed in an approximately V-shape when seen from the rear of the vehicle. The trailing arm 16 and the lower arm 20 are relatively displaceably coupled with a pair of bolts 48 and 48 inserted into the bolt insertion holes 42 in the pair of rubber bushes 44a and 44b and the pair of opposed pieces 40a and 40b.

The hinge mechanism 22 includes: the pair of opposed pieces 40a and 40b provided in the arm main body part 28 of the trailing arm 16; the vehicle width outer end 20a of the lower arm 20; the pair of rubber bushes 44a and 44b attached to the vehicle width outer end 20a; and the pair of bolts 48 and 48 for fastening the vehicle rear end of the trailing arm 16 and the vehicle width outer end 20a of the lower arm 20 through the pair of rubber bushes 44a and 44b.

The vehicle width inner end 20b of the lower arm 20 has a lower arm bush 50 attached thereto, which turnably supports the lower arm 20 relative to the rear cross member 4.

Between the vehicle width outer end 20a and the vehicle width inner end 20b of the lower arm 20, a recess 52 is formed in a composite shape obtained by combining an approximately circular shape and a triangular shape in the top view. In this recess 52, the damper 24 for damping vibrations transmitted from the wheel 12 and the spring (coil spring) 26 for exerting spring force are separately disposed. Note that the damper 24 is attached to the lower arm 20 so as to be rotatable around a rod 53 fastened to the lower arm 20.

Inside the recess 52, the spring 26 is positioned on the outside in the vehicle width direction and the damper 24 is positioned on the inside in the vehicle width direction. In other words, the damper 24 is disposed on the inner side in the vehicle width direction of the lower arm 20 than the spring 26.

As described above, the trailing arm 16 and the lower arm 20 are rotatably attached to the vehicle body floor 1 through the trailing bush 32 and the lower arm bush 50.

The trailing bush 32 is configured including: an inner bush member (not shown); an outer bush member 56 disposed on the outer diameter side of the inner bush member and connected to the trailing arm 16; a rubber elastic body (not shown) interposed between the inner bush member and the outer bush member 56; and a shaft member 60 penetrating the inner bush member. Note that the lower arm bush 50 has basically the same configuration as the trailing bush, and thus description of the lower arm bush 50 is omitted.

On both sides of the shaft member 60 along an axial direction, flat plate-shaped plate pieces 70 and 70 are provided having a pair of mounting holes 69 and 69 into which the bolts 68 and 68 can be inserted. By inserting the bolts 68 and 68 into the mounting holes 69 and 69, the trailing bush 32 is attached to the vehicle body floor 1.

Referring back to FIG. 1, the lower arms 20 and 20 are disposed along the tilted part 4a of the rear cross member 4. Also, the lower arms 20 have their leading ends fixed to the rear cross member 4 through the lower arm bushes 50 on the boundaries between the tilted parts 4a and the straight part 4b. Portions attached to the vehicle body floor 1 (rear cross member 4) through the lower arm bushes 50, which are regions surrounded by the dashed-dotted lines in FIG. 1, correspond to suspension mounting portions R1. Note that the suspension mounting portions R1 do not each mean a small (one) region to be fixed with the bolt 68 but each mean a part including a region around the lower arm bush 50 and the bolt 68.

Moreover, the second frame parts 112 and 112 of the fixing frame 110 have their leading ends extending to positions overlapping in the top-bottom direction (vertical direction) with the suspension mounting portions R1. More specifically, portions of the second frame parts 112 and 112 attached to the vehicle body floor 1 (rear cross member 4), which are regions surrounded by the dashed-dotted lines in FIG. 2, correspond to frame mounting portions R2. Thus, the frame mounting portions R2 are set at positions overlapping in the top-bottom direction with the suspension mounting portions R1 (see FIG. 1). Note that the frame mounting portions R2 do not each mean a small (one) region to be fixed with the bolt 111b but each mean a part including a region around the bolt 111b. Moreover, the frame mounting portions R2 do not need to entirely overlap with the suspension mounting portions R1 but may partially overlap with the suspension mounting portions R1.

Note that although the trailing arm 16 and the lower arm 20 are formed of separate members in this embodiment, the trailing arm 16 and the lower arm 20 may be integrally formed.

Figure 4:
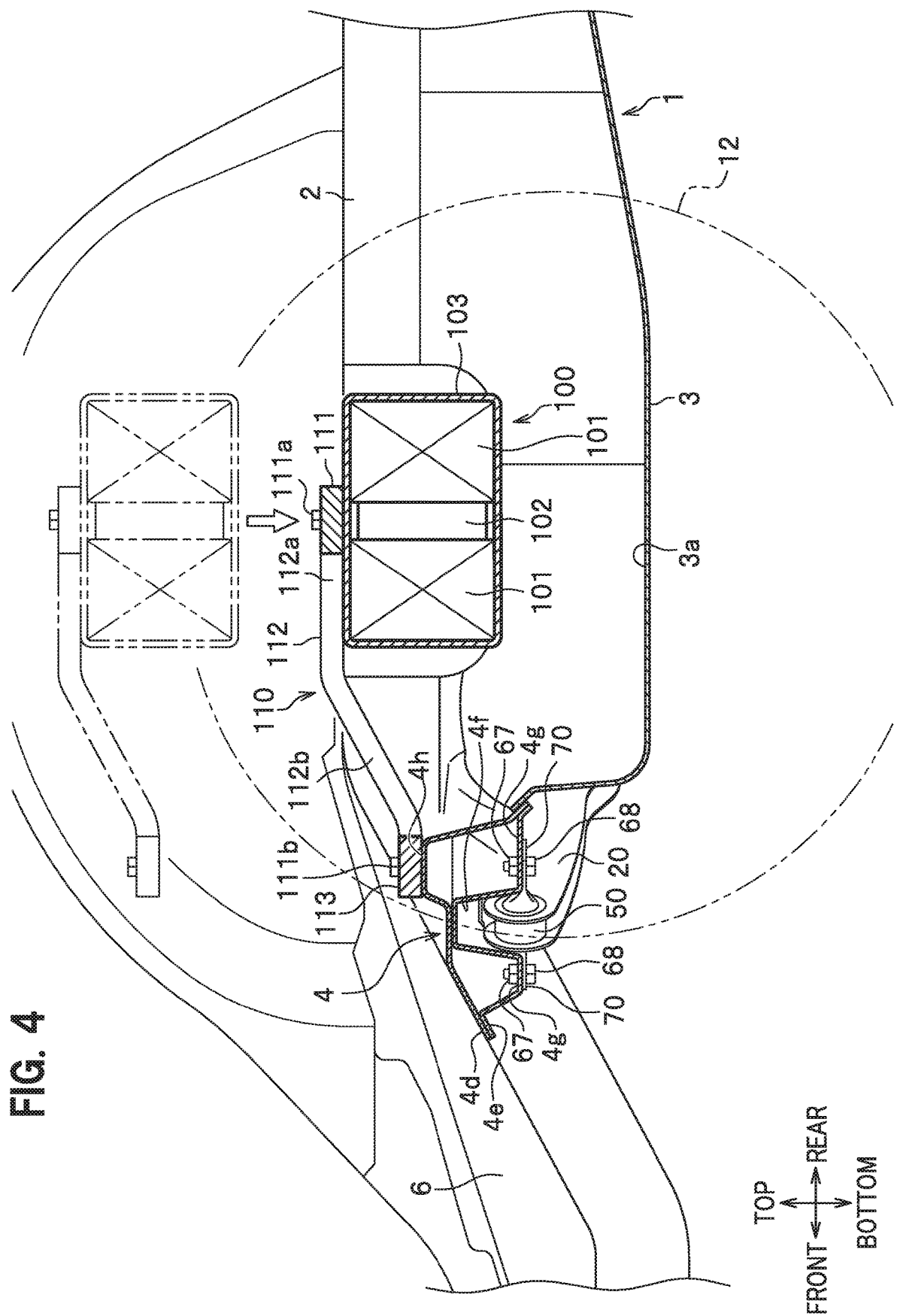
FIG. 4 is a cross-sectional view taken along the line IV-IV in FIG. 2.

FIG. 4 is a cross-sectional view taken along the line IV-IV in FIG. 2. Note that FIG. 4 shows a state sectioned along the center in the vehicle width direction.

As shown in FIG. 4, the power supply device 100 is fixed to the first frame part 111 of the fixing frame 110 with a bracket (not shown) and the like. Also, the power supply device 100 is disposed above the vehicle body floor 1 in a suspended state from the fixing frame 110. More specifically, the power supply device 100 is not fixed to the vehicle body floor 1.

Moreover, the power storage device of the power supply device 100 is configured by arranging two battery modules 101 in the front-rear direction, each battery module 101 including a plurality of battery cells arranged in the space vertical direction in FIG. 4. Also, the front battery module 101 and the rear battery module 101 are electrically connected through a connection circuit 102. Moreover, the battery modules 101 and 101 are housed in a case 103 made of resin.

In the fixing frame 110, the first frame part 111 for fixing the power supply device 100 is formed at a position higher than the rear cross member 4. The second frame part 112 has a horizontal portion 112a extending forward at the same height position as the first frame part 111 and a tilted portion 112b extending forward and downward from the horizontal portion 112a.

The rear floor panel 3 has a recess 3a with a recess surface facing upward. The power supply device 100 is housed in the recess 3a in a suspended state by being fixed to the fixing frame 110. With the power supply device 100 and the fixing frame 110 connected as described above, the power supply device 100 can be mounted to the vehicle body floor 1 by lowering the power supply device 100 fixed to the fixing frame 110 as indicated by the two-dot chain lines, thereby facilitating amounting operation of the power supply device 100.

The rear cross member 4 has the rear floor panel 3 attached (fixed) thereto by welding. Also, the rear cross member 4 is configured by combining an upper surface part 4d disposed on the upper side with a lower surface part 4e disposed on the lower surface. The lower surface part 4e has a recess 4f formed therein, in which approximately the half of the lower arm bush 50 is housed. The recess 4f is formed so as to be elongated along the lower arm 20. Moreover, the lower surface part 4e has fixing surfaces 4g and 4g on approximately front and rear sides of the recess 4f, to which nuts 67 are fixed. The lower arm bush 50 is fixed to the rear cross member 4 by placing the plate pieces 70 on the fixing surfaces 4g from below and screwing the plate pieces 70 and the fixing surfaces 4g together with the bolts 68 and the nuts 67. Note that, when the lower arm bush 50 is fixed to the rear cross member 4, positions (regions) including the bolts 68 and the nuts 67 correspond to the suspension mounting portions R1 (see FIG. 1).

In the rear cross member 4, a protruding part 4h protruding upward to fix the fixing frame 110 is formed in an upper surface part 4d. In a state where the second frame parts 112 and 112 and the connection part 113 of the fixing frame 110 are in contact with the protruding part 4h, the second frame parts 112 and 112 are fixed to the rear cross member 4 with the bolts 111b. Note that the illustration of nuts to be screwed with the bolts 111b is omitted.

Figure 5:
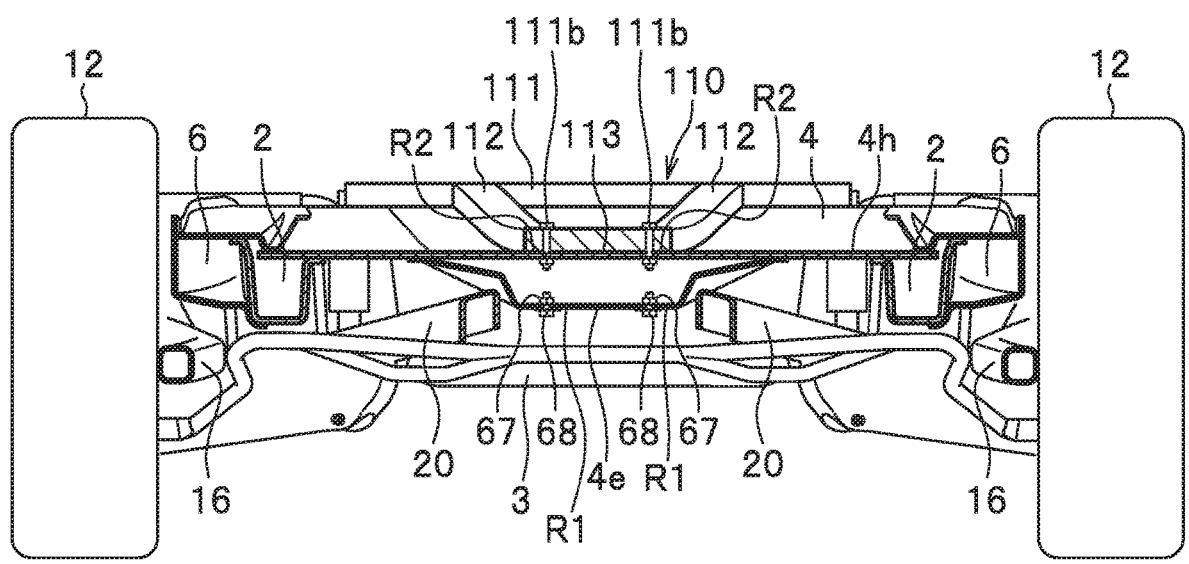
FIG. 5 is a cross-sectional view taken along the line V-V in FIG. 2.

FIG. 5 is a cross-sectional view taken along the line V-V in FIG. 2. Note that FIG. 5 shows a state sectioned at the positions of the bolts 68 and the nuts 67 on the rear side for mounting the lower arm bush 50.

As shown in FIG. 5, in the vehicle body structure of this embodiment, the suspension mounting portions R1 and R1 for mounting the lower arm 20 and the frame mounting portions R2 and R2 for mounting the fixing frame 110 to fix the power supply device 100 to the vehicle body floor 1 (rear cross member 4) are disposed so as to overlap with each other in the top-bottom direction (vertical direction).

Meanwhile, as shown as a comparative example in FIG. 6, in the case of adopting a semi-trailing type as a rear suspension in a vehicle having the power supply device 100 mounted onto the vehicle body floor 1 with the fixing frame 200, vibration input from the lower arm is concentrated in the center part of the vehicle, leading to a problem of deteriorated load noise performance. Note that regions indicated by reference numerals R10 in FIG. 6 represent fastening portions (suspension mounting portions) of the lower arm to the vehicle body floor 1, while regions indicated by reference numerals R20 represent fastening portions (frame mounting portions) of the fixing frame 200 to the vehicle body floor 1. In this case, as a method for reducing load noise, there is a method for turning the lower arm fastening portions into sub-frames. However, although it is required to perform load application or vibration input dispersion in the center part of the vehicle body, such a sub-frame structure causes increases in cost and weight.

Figure 7:
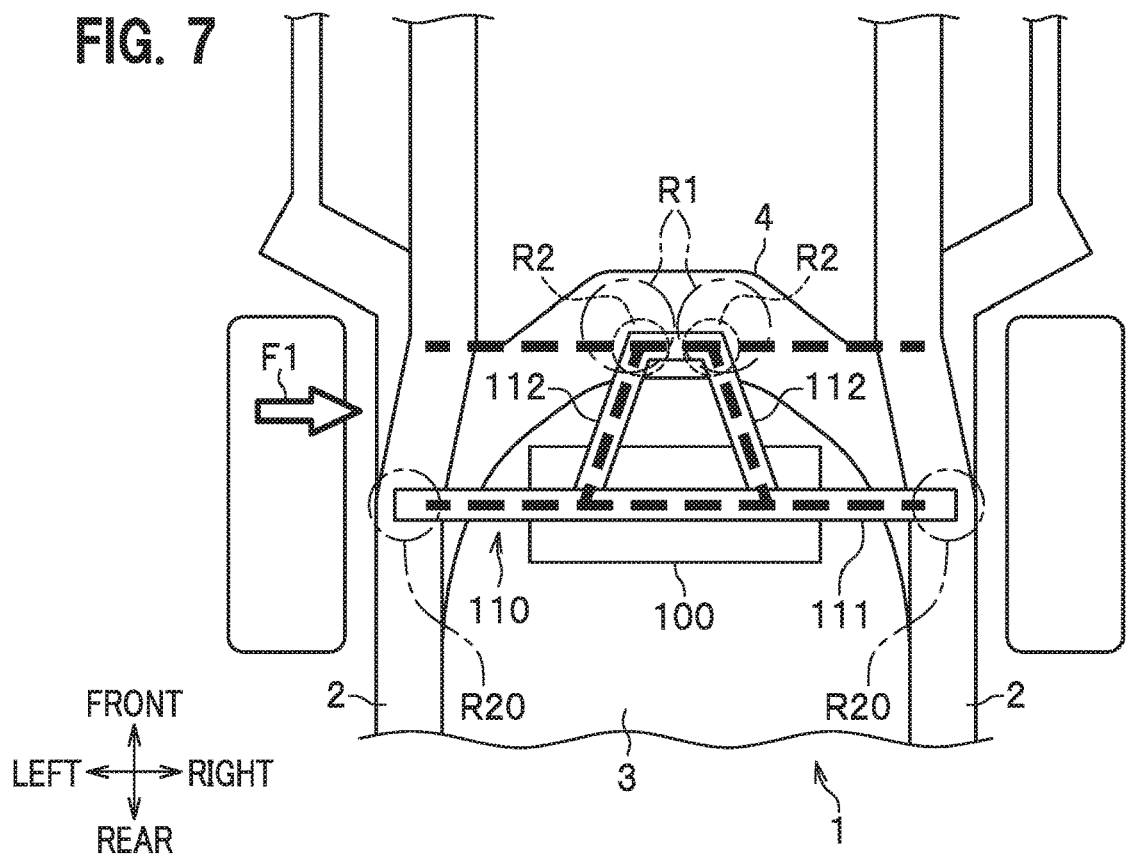
FIG. 7 is a view for explaining an advantageous effect of the vehicle body structure according to the first embodiment.

Therefore, in the first embodiment, the fastening portions (frame mounting portions R2 and R2) of the second frame parts 112 and 112 to the vehicle body floor 1 (rear cross member 4) overlap with the upper parts of the fastening portions (suspension mounting portions R1 and R1) of the lower arm 20 (see FIG. 1) to the vehicle body floor 1 (rear cross member 4) as shown in FIG. 7. Thus, the load of the power supply device 100 can be applied to the fastening portions (suspension mounting portions R1 and R1) of the lower arm 20. Accordingly, vibrations inputted from the rear wheels 12 to the vehicle body floor 1 through the suspension devices 10 can be suppressed. As a result, the load noise performance can be enhanced. Moreover, since there is no need to turn the fastening portions of the lower arm 20 into sub-frames, increases in cost and weight can be suppressed.

Moreover, as indicated by the thick broken lines in FIG. 7, in the vehicle body structure of the first embodiment, the vehicle body floor 1 (rear cross member 4) and the fixing frame 110 form a ladder-shaped structure in the vehicle width direction. This can enhance the rigidity to load F1 from the side of the vehicle in the event of vehicle collision.

Figure 8:
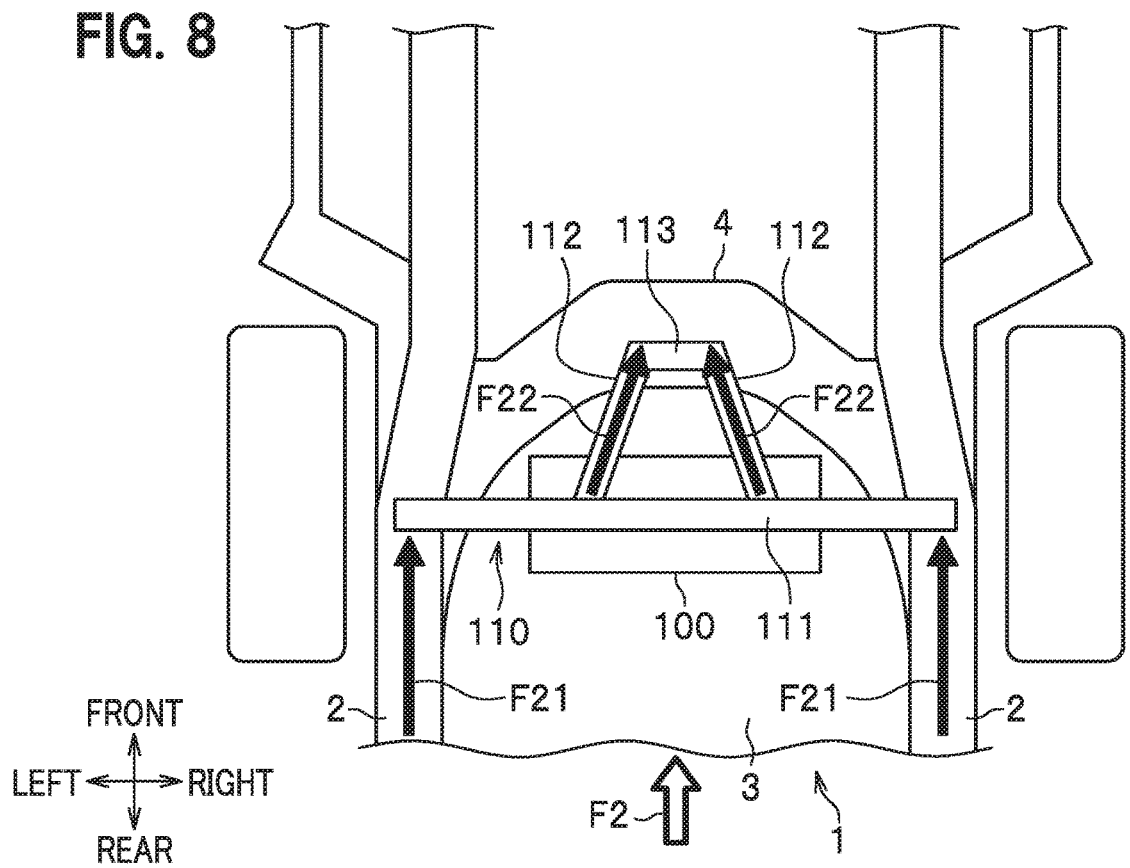
FIG. 8 is a view for explaining another advantageous effect of the vehicle body structure according to the first embodiment.

Meanwhile, as indicated by the thick solid arrows in FIG. 8, in the vehicle body structure of the first embodiment, when load F2 is inputted from behind the vehicle in the event of vehicle rear-end collision and loads F21 and F21 are transmitted to the rear side frames 2 and 2, the loads inputted along the rear side frames 2 and 2 can be dispersed as loads F22 and F22 to the fixing frame 110 side.

As described above, the vehicle body structure of the first embodiment includes: the pair of left and right suspension devices 10 provided below the vehicle body floor 1; the suspension mounting portions R1 for mounting the suspension devices 10 to the vehicle body floor 1; the power supply device 100 that supplies power to drive the vehicle; the fixing frame 110 that supports the power supply device 100; and the frame mounting portions R2 for mounting the fixing frame 110 to the vehicle body floor 1. Moreover, in the vehicle body structure of the first embodiment, the frame mounting portions R2 are disposed at the positions overlapping in the top-bottom direction with the suspension mounting portions R1. Accordingly, vibrations propagated from the suspension devices 10 (lower arms 20) to the vehicle body floor 1 can be effectively suppressed. More specifically, there is no need to turn the fastening portions of the lower arms 20 into sub-frames to suppress the vibrations generated in the vehicle body floor 1. Thus, increases in cost and weight can be suppressed. Moreover, the load of the power supply device 100 as a heavy load can be applied to the fastening portions (suspension mounting portions R1) of the lower arm 20. Thus, noise vibration performance can be improved to enhance the load noise performance.

Moreover, in the first embodiment, the fixing frame 110 includes: the first frame part 111 that extends in the vehicle width direction (left-right direction) and is fixed to the left and right rear side frames 2 and 2; and the second frame parts 112 and 112 that extend from the first frame part 111 toward the suspension mounting portions R1 and R1. Therefore, the power supply device 100 can be stably supported by the fixing frame 110, and also the load of the power supply device 100 can be inputted to the regions of the suspension mounting portions R1. Thus, vibrations (noise vibrations) can be effectively suppressed.

Moreover, in the first embodiment, the second frame parts 112 and 112 extend inward from the outside in the vehicle width direction so as to be tilted to the front-rear direction (see FIG. 8). Therefore, when a load from behind the vehicle is inputted to the rear side frames 2 by rear-end collision the vehicle, the inputted load can be dispersed to the second frame parts 112 and 112.

Moreover, in the first embodiment, the pair of left and right second frame parts 112 and 112 are provided (see FIG. 7). In the first embodiment, the vehicle body floor 1 (rear cross member 4) and the fixing frame 110 (first frame part 111 and second frame parts 112 and 112) can form the ladder-shaped structure. Thus, the rigidity to the load F2 from the side due to collision can be enhanced. As a result, in the first embodiment, it is made easier to protect the power supply device 100.

Moreover, in the first embodiment, the first frame part 111, the pair of left and right second frame parts 112 and 112, and the connection part 113 of the fixing frame 110 form a closed space Q in the plan view (see FIG. 2). Accordingly, the rigidity of the fixing frame 110 can be enhanced, and the rigidity to the load F1 from the side can be further enhanced, thus making it much easier to protect the power supply device 100.

Second Embodiment

Figure 9:
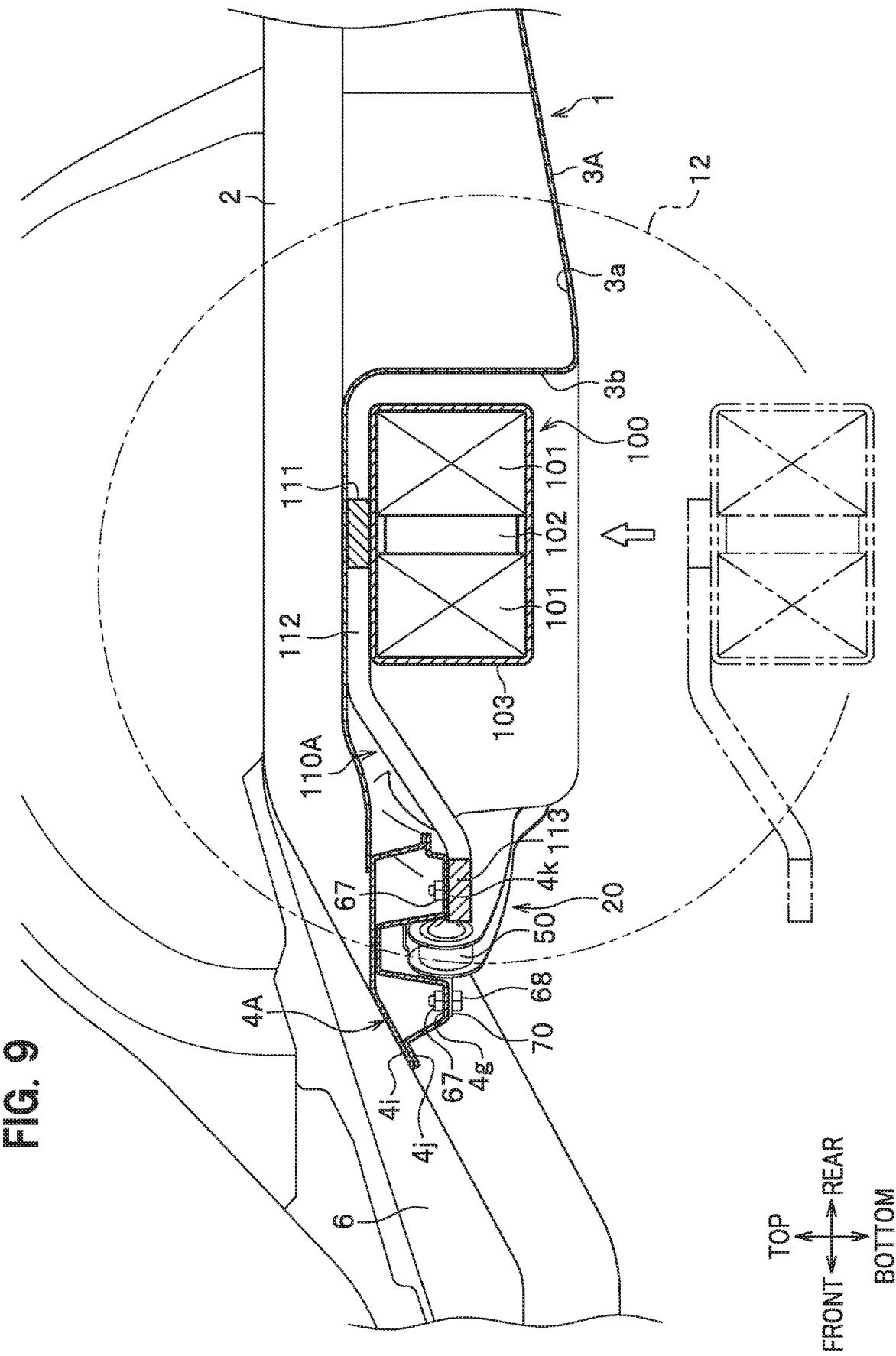
FIG. 9 is a cross-sectional view schematically showing a vehicle body structure according to a second embodiment.

FIG. 9 is a cross-sectional view schematically showing a vehicle body structure according to a second embodiment. Note that the same constituent components as those of the first embodiment are denoted by the same reference numerals, and repetitive description thereof is omitted.

As shown in FIG. 9, in the vehicle body structure of the second embodiment, a fixing frame 110A having a power supply device 100 fixed thereto is mounted from below a vehicle body floor 1. Also, the power supply device 100 is supported in a suspended state from the fixing frame 110A, as in the case of the first embodiment.

A rear floor panel 3A has a depressed part 3b formed in front of a recess 3a, the depressed part 3b being formed with a recess surface facing downward. This depressed part 3b is configured as a space capable of housing the power supply device 100. Thus, the power supply device 100 can be mounted to the vehicle body floor 1 by lifting the power supply device 100 fixed to the fixing frame 110A from below the vehicle body floor 1 (bottom side of the vehicle). Note that the fixing frame 110A has both left and right ends of the first frame part 111 fixed to the lower surface of the rear side frame 2 with bolts and the like.

A rear cross member 4A is configured by combining an upper surface part 4i disposed on the upper side and a lower surface part 4j disposed on the lower side. The lower surface part 4j has a mounting part 4k formed therein for mounting the fixing frame 110A. In a state where second frame parts 112 and 112 and a connection part 113 of the fixing frame 110A are in contact with a lower surface of the mounting part 4k, the second frame parts 112 and 112 are fixed to the rear cross member 4A with bolts and nuts (not shown).

In the second embodiment, the fastening portions (frame mounting portions) of the second frame parts 112 and 112 to the vehicle body floor 1 (rear cross member 4A) overlap with upper parts of the fastening portions (suspension mounting portions) of the lower arm 20 to the vehicle body floor 1 (rear cross member 4A).

Thus, in the second embodiment, again, as in the case of the first embodiment, the load of the power supply device 100 as a heavy load can be applied to the fastening portions (suspension mounting portions) of the lower arm 20. Thus, noise vibration performance can be improved to enhance the load noise performance. Moreover, as in the case of the first embodiment, increases in cost and weight can be suppressed. Moreover, as described with reference to FIG. 7, with the rear cross member 4A and the fixing frame 110A forming the ladder-shaped structure, the rigidity to load from the side can be enhanced. Furthermore, as described with reference to FIG. 8, with the fixing frame 110A including the second frame parts 112 and 112, a load dispersion effect for the load from behind can be enhanced.

Although the embodiments have been described above, the present invention is not limited to those embodiments but may be implemented in various other embodiments. For example, in the above embodiments, the description has been given of the case, as an example, where the connection part 113 is provided to connect the second frame parts 112 and 112. However, the second frame parts 112 and 112 may have their leading ends divided without providing the connection part 113. Moreover, a frame part extending in a direction perpendicular to the first frame part 111 may be provided in place of the second frame parts 112 and 112 of the fixing frame 110.

Moreover, in the above embodiments, the description has been given of the case, as an example, where the power supply device 100 is disposed behind the rear cross member 4. However, the power supply device 100 may be disposed in front of the rear cross member 4.

What is claimed is:

1. A vehicle body structure comprising:
    a pair of left and right suspensions provided below a vehicle body floor;
    suspension mounting portions for mounting the suspensions to the vehicle body floor;
    a power supply device that supplies power to drive a vehicle;
    a frame that supports the power supply device; and
    frame mounting portions for mounting the frame to the vehicle body floor, wherein
    the frame mounting portions are disposed above the suspension mounting portions in a vertical direction, and the frame includes: a first frame part that extends in a vehicle width direction and is fixed to left and right side frames, and a second frame part that extends from the first frame part toward the suspension mounting portions,
    wherein the second frame part is mounted on an upper side surface of the vehicle body floor.

2. The vehicle body structure according to claim 1, wherein the second frame part extends inward from outside in the vehicle width direction so as to be tilted in a front-rear direction.

3. The vehicle body structure according to claim 1, wherein the second frame part is provided in pair of left and right second frame parts.

4. The vehicle body structure according to claim 3, wherein the frame forms a closed space in a plan view with the pair of left and right second frame parts and the first frame part.

* * * * *